2,698,966

PROCESS FOR PRODUCING SHAPED ARTICLES FROM MIXTURES OF POLYAMIDES

Louis L. Stott, Reading, Pa., and Laurence R. B. Hervey, West Concord, Mass., assignors, by direct and mesne assignments, to The Polymer Corporation, Reading, Pa., a corporation of Pennsylvania No Drawing. Application September 27, 1951, Serial No. 248,646

8 Claims. (Cl. 18—55)

This invention relates to the art of molding high molecular weight synthetic linear polyamides known as nylon. The synthetic polymeric materials used in the practice of this invention are the synthetic linear polyamides of the general type described in United States Patents 2,710,250, 2,710,253 and 2,130,948. The polymers there described are high molecular weight products which generally can be obtained crystalline in structure as evidenced by X-ray powder diffraction patterns of the polymers in the massive state.

The polyamides of the present type, generally speaking, comprise the reaction product of a linear polymer-forming composition, for example, one consisting essentially of bifunctional reacting material, which comprises in substantial amount molecules containing two amide-forming groups each of which is complementary to an amide-forming group in the other molecules in said composition.

These polyamides as described above or as otherwise identified hereinafter can be obtained, for example, by self polymerization of monoamino-monocarboxylic acid, and by reacting a diamine with a dibasic carboxylic acid in substantially equimolecular amounts, it being understood that references herein to the amino acids, diamines and dibasic carboxylic acids is intended to include the equivalent amide-forming derivatives of these reactants.

These linear polyamides include also polymers obtained by admixture of other linear polymer-forming reactants, as for instance glycol-dibasic acid mixtures in the case of polyester-amides, with the mentioned polyamide-forming reactants. The best results in the practice of the invention described herein, however, are obtained with unmodified straight polyamides. In the interpolymers, as well as in the simple polyamides, the average number of carbon atoms separating the amide groups is at least two. On hydrolysis with hydrochloric acid the amino acid polymers yield the amino acid hydrochloride, and the diamine-dibasic acid polymers yield the diamine hydrochloride and the dibasic carboxylic acid. For the sake of simplicity the linear polyamides described above will be referred to herein as nylon.

Although these materials were originally introduced as fibers for use in the textile industry they have subsequently been made available as raw materials for the molding and extrusion industries. The high melting nylons, such as polyhexamethylene adipamide and polyhexamethylene sebacamide, are characterized by relatively sharp melting points and high fluidity in the molten condition in comparison to other thermoplastic materials, such as cellulose acetate and polysytrene. At the present time shaped nylon pieces are prepared commercially, either by machining solid nylon, such as nylon rod, or by melting nylon and forming it by injection molding. Compression molding, i. e. molding nylon powder under pressure in a hot mold with sufficient temperature to cause the nylon to melt has proved in most cases to be impractical because of its high fluidity in the molten condition.

All of these methods require the use of virgin nylon and have other severe drawbacks. Bearings machined from nylon rod, for instance, are relatively expensive to make and involve much waste. Furthermore, the present manufacturing techniques for producing nylon rod, particularly for the larger sizes, frequently introduces severe strains which must be removed by conditioning. The injection molding technique requires complicated and expensive apparatus, high cost molds, and also frequently results in a product having many strains. These strains often cause bearings prepared by injection molding to seize in an erratic manner if large clearances are not provided. The presently used molding techniques depend upon heating a polyamide above its melting point and exerting pressure on the molten material. The strains produced in the resultant article come as a consequence of cooling the molten material and, at least in part, are due to a relatively high volumetric shrinkage on solidification.

In accordance with U. S. application Serial No. 216,845 filed March 21, 1951, in the name of Louis L. Stott, one of the co-inventors of the invention herein described and claimed, a process of molding and sintering nylon articles below the melting point of the nylon is described. By this process a molded article is made by compressing nylon powder having a diameter of 40 microns or less with sufficient pressure so that the article may be handled; strength is imparted to the compressed article by sintering it, i. e. by heating it to a temperature close to but below the melting point of the nylon. In accordance with U. S. application Serial No. 227,283 filed May 19, 1951, also in the name of the same Louis L. Stott, sintered nylon articles containing fillers are described. An article prepared by this process is made by compressing nylon powder having a diameter of 40 microns or less, mixed thoroughly with the filler with a sufficient pressure so that the shaped article may be handled. The compressed article is thereafter heated to a temperature sufficient to sinter the particles of nylon without inducing any substantial molten phase. While these methods yield fully satisfactory products, the sintering temperature range for any given nylon is severely limited.

It is the primary object of this invention to produce nylon articles from a mixture of nylon powders by a process which permits the use of a relatively wide temperature range. Still another object of this invention is to produce nylon articles with or without fillers in a rapid and economical manner. A further object of this invention is to produce nylon articles with or without fillers which are substantially free from internal strains. These and other objects which will become apparent hereafter may be accomplished as follows:

In the process of this invention at least two types of nylon powder having different melting points are employed. The nylon having the highest melting point must be in the form of a powder, the particles of which have a diameter of 40 microns or less; the other is preferably also finely divided. The two powders are thoroughly mixed with or without the incorporation of a filler and compressed to the desired shape with a pressure sufficient to form a green article which may be handled. The article is thereafter heated to a temperature above the melting point of the lower melting nylon.

If an excessive amount of the lower melting nylon is employed, the article will become distorted upon sintering, while if an insufficient amount of the low melting nylon is used, and no sintering of the high melting material has taken place, the resultant nylon article will lack strength. The preferred composition comprises 20 to 30 parts by weight of the lower melting nylon and 80–70 parts by weight of the higher melting nylon, but amounts as low as 15 per cent of the lower melting nylon to 70 per cent lower melting nylon may be employed.

An inert filler may be employed and may be any finely divided material which is substantially non-reactive with nylon at the temperatures employed, has a higher melting point than the temperature to which the nylon article is to be raised, and is not subject to any undesirable amount of decomposition during the heating step. The filler is incorporated by thoroughly mixing it with the nylon powders before the compression step. The purpose of the filler is to impart certain specific and desired qualities to the finished article. If an abrasive is to be manufactured, abrasive particles may be incorporated such as diamond dust, ground silica, carborundum, chalk, Alundum, tungsten carbide, etc. For other purposes metal powders, such as copper, lead, or iron, may be added to get the desired properties. For still other purposes carbon or graphite particles, or molybdenum disulfide particles, may be added. In some cases ceramic materials with special dielectric properties are advantageously added including titanium dioxide and various titanates.

Also magnetic materials may be added in either metallic or oxide form. Other materials such as polytetrafluoroethylene may be a useful filler. The filler may be added in amounts up to 85% of the total bulk volume of the nylon powder mixture. Materials which are termed stabilizers or oxidation inhibitors, may also be included. These can conveniently be incorporated in the products of this invention by adding them to the lower melting nylon. Upon heating the lower melting nylon above its melting point the stabilizer becomes intimately admixed with the entire article.

As stated above, it is essential that the high melting nylon be 40 microns or less in diameter. It is preferred, however, that the average particle size of the ultimate particles be about 25 microns in diameter. It should be noted that the best products have been prepared using nylon having an average particle size of 10 microns or less in diameter.

In the preparation of nylon for the molding step difficulty has been encountered in using fine nylon powder because of the large bulking property of such powder and because it does not flow easily into a mold. It has been found that this difficulty may be overcome by first granulating the nylon as by tabletting the material and subsequently grinding the tablets. A convenient size of these granules has been found to be of a size which will pass through a 40-mesh sieve and preferably an 80-mesh sieve.

The higher melting nylon powder having an ultimate particle size required by this invention may be obtained in accordance with the process as described in our U. S. application Serial No. 91,638 filed May 5, 1949, now abandoned U. S. application Serial No. 95,587 filed May 26, 1949, now Patent No. 2,592,616 and U. S. application Serial No. 202,405 filed December 22, 1950, now Patent No. 2,639,278. These methods disclose that nylon may be dissolved in mixtures of lower alcohols and water or methanol alone under pressure and at elevated temperatures and that nylon may be dissolved in polyhydric alcohols merely by heating the alcohol and nylon together. Oxygen is excluded during the time the nylon is in solution. Upon cooling, or upon dilution with water, the nylon precipitates as a fine powder which, when washed and dried, is suitable for the present process. If waste nylon is employed, undissolved material is preferably removed as by filtration when the polymer is in solution.

Nylon powder obtained by other methods has not so far proved to be satisfactory. This may be because of the difficulty in obtaining material having an average particle size of less than 40 microns. Polyhexamethylene adipamide powder was obtained by treating nylon with liquid nitrogen to embrittle it, hammer milling the cold nylon to powder it, and screening the powder to separate the larger particles. The majority of the screened particles had an average diameter of about 50 microns and ranged in size from 15 to 100 microns in diameter. Attempts to grind the nylon did not succeed in obtaining sufficiently fine nylon powder for the purposes of this invention. But for whatever the reason, it is known that the nylon produced in accordance with the above-identified applications and having an average particle size diameter in the order of 40 microns in diameter or less is satisfactory.

The higher melting nylon is in no sense a filler as we have found that it performs a function differing from other material sused as fillers. It is believed that when the temperature is raised sufficiently to melt the lower melting nylon, that the surface at least of the higher melting nylon dissolves in the lower melting nylon to form a tightly bonded structure. That the higher melting nylon acts differently than a filler is borne out by the fact that as high as 70% of the lower melting nylon may be incorporated in the nylon mixture without encountering noticeable distortion and shrinkage when the temperature is raised sufficiently to produce a molten phase in the lower melting nylon. If a filler, such as graphite is substituted for the higher melting nylon only about 20% of nylon in the molten phase may be employed. It has been further found that the higher melting nylon must have a particle size diameter of 40 microns or less and preferably less than 25 microns in order to obtain products having acceptable strength before distortion of the article takes place.

The process of preparing molded articles in accordance with this invention may be described generally as follows:

The filler, if one is to be used, and the nylon powders, preferably in a well dried condition, are thoroughly mixed in any convenient manner as by stirring the materials together. The resultant mixture is placed in a mold and compressed in the mold, preferably at room temperature, but always below sintering temperature, with sufficient pressure to cause the molded shape to withstand moderate shocks incident to its handling. The practical working pressures employed range generally between about 10 tons per square inch and 50 tons per square inch. While the pressures do not seem to be critical, it has been found that about 25 tons per square inch is a very satisfactory pressure. Pressure in the order of 3 tons per square inch yields a shaped product which may be handled only with considerable care and when fired has a compressive strength of about one-half that of a similar piece pressed at 25 tons per square inch. Pressures in excess of 75 tons per square inch are not required.

Before molding, the mixed powders with or without a filler may be granulated, if desired, to obtain freer flowing powder. Granulation is accomplished by tabletting the fine powders at pressures below those used during the molding step. The resultant tablets are ground to pass a 40 to 100 mesh screen and introduced into the mold.

After molding, the cold preformed nylon article is then sintered by heating it under non-oxidizing conditions to a temperature above the melting point of the lowest melting nylon present for a time sufficient to cause the lower melting nylon to melt. This time range is usually from 2 to 30 minutes. The temperature must be below that which will cause the higher melting nylon to develop any substantial molten phase. We have found that while the optimum temperature is close to the melting point of the higher melting material, temperatures from 5 to 25 degrees above the melting point of the lowest melting nylon present yield articles which are strong.

The presence of moisture in the nylon powder can under some conditions cause cracks to appear in the bearings on sintering. This is particularly true when the sintering is done in hot oil as contrasted with sintering in vacuo. It has been found that relatively small bearings contaning 3% moisture or more before sintering, will crack if immersed directly in hot oil. On the other hand, a similar bearing first immersed in cold oil and then the oil raised slowly to the sintering temperature will be free from cracks. It is therefore preferred to keep the moisture content of the formed nylon article before sintering as low as possible, preferably below about 1% moisture. In the case of large solid objects, the presence of moisture is more critical and a vacuum drying step either on the powder or the preform is desirable.

As a specific example of the method of operating our process, the following is submitted.

Polyhexamethylene adipamide powder melting at 271° C. was prepared in accordance with our U. S. application Ser. No. 202,405 from waste nylon.

Polyhexamethylene sebacamide power melting at 224° C. was prepared in accordance with our U. S. application Ser. No. 202,405 from virgin material. The powders were thoroughly mixed, a ratio of 20 parts of polyhexamethylene sebacamide and 70 parts of polyhexamethylene adipamide by weight, tabletted in a commercial tabletting machine, ground, and passed through an 80 mesh screen. The granulated material was placed in a mold and compressed at a pressure equal to 25 tons per square inch. The resulting article, a bearing ⅞ in. long having an I. D. of ½ in. and an O. D. of ¾ in. was placed in an oil bath having a temperature of 225° C for 10 minutes. Other bearings were prepared with varying amounts of polyhexamethylene sebacamide ranging from 15% to 70% by weight of total nylon. The heating steps may be carried out in vacuum or under conditions where oxygen may be excluded by substituting nitrogen or other inert gas for air. Bearings made at various temperatures showed that increasing temperatures in excess of 225° C. increased the strength of the bearings, but temperatures from 225° C. or more up to the melting point of the polyhexamethylene adipamide yielded bearings of satisfactory strength.

As stated above, the incorporation of the lower melting nylon powder with the higher melting nylon gives a much wider latitude in temperature during the sintering step than is possible when sintering one nylon alone. If the nylon article is sintered below the sintering temperature of the higher melting nylon, strong articles can, nevertheless, be made. At least 15% of the lower melting nylon must be incorporated and the temperature raised during the heating step sufficiently to melt the low melting nylon. Up to about 70% of the low melting nylon may be incorporated and increasing amounts of low melting nylon yield articles having increasing break strengths. When more than 70% low melting nylon is employed, undesirable distortion takes place.

The preferred amount of the lower melting nylon ranges from 30% to 40%.

The above example was directed to the production of bearings. The performance of bearings made by our process is fully equal to those prepared by injection molding or machining methods and superior in that they tended to seize less under identical conditions. It is readily apparent that the process is applicable to the formation of numerous different articles having the wear resistance, low coefficient of friction, heat resistance, and many of the other qualities associated with conventionally molded or machined nylon articles.

Other combinations of nylons having differing melting points may be employed. Interpolymers in the form of a molding powder having a lower melting point than polyhexamethylene sebacamide may also be used with advantage.

Having now described our invention we claim:

1. A process for producing shaped articles from high molecular weight synthetic linear polyamides which comprises the steps of intimately mixing a first finely divided synthetic linear polyamide material having a relatively high melting point with a second finely divided synthetic linear polyamide material having a melting point below said first polyamide, compressing said mixture to a predetermined shape at substantially room temperature in a mold at a pressure required to allow the shaped article to be removed from the mold, removing said shaped article from the mold and heating said article in the substantial absence of oxygen for a time and at a temperature required to melt said second polyamide but below that which will cause any substantial molten phase in said first polyamide, said first polyamide having a particle size of less than 40 microns in diameter, and said second polyamide being present in an amount not exceeding 70% by weight of said first polyamide.

2. The process in accordance with claim 1 wherein the relatively high melting polyamide is polyhexamethylene adipamide.

3. The process in accordance with claim 1 wherein the relatively high melting polyamide is polyhexamethylene sebacamide.

4. The process in accordance with claim 1 wherein the polyamides employed are polyhexamethylene adipamide and polyhexamethylene sebacamide and the temperature of heating is from 225° C. to just below the melting point of the polyhexamethylene adipamide.

5. A process for producing a nylon bearing from finely divided polyhexamethylene adipamide and finely divided polyhexamethylene sebacamide which comprises the steps of intimately mixing said finely divided polyhexamethylene adipamide and said finely divided polyhexamethylene sebacamide, compressing the mixture in the form of a bearing with no substantial elevation of temperature at a pressure of from 10 to 50 tons per square inch, removing the green bearing from the mold and heating it to a temperature of from 225° C. to 250° C. for from 2 to 30 minutes, said finely divided polyhexamethylene adipamide having a diameter of 40 microns or less.

6. The process in accordance with claim 5 wherein the finely divided polyhexamethylene adipamide is prepared by dissolving nylon in hot ethylene glycol, precipitating polyhexamethylene adipamide in the form of a fine powder, removing the residual ethylene glycol from said powder and drying.

7. The process in accordance with claim 5 wherein the finely divided polyhexamethylene adipamide is prepared by dissolving clean nylon waste in hot ethylene glycol, precipitating polyhexamethylene adipamide in the form of a fine powder, removing the residual ethylene glycol from said powder and drying.

8. The process for producing a nylon bearing in accordance with claim 7 wherein said finely divided polyhexamethylene adipamide, and said polyhexamethylene sebacamide are prepared by precipitating them separately from a solution of hot ethylene glycol, washing each said precipitated nylon powder with water until it is free from ethylene glycol, and drying said powder.

References Cited in the file of this patent

UNITED STATES PATENTS

| Number | Name | Date |
|---|---|---|
| 2,154,436 | Catlin | Apr. 18, 1939 |
| 2,172,374 | Flory | Sept. 12, 1939 |
| 2,193,529 | Coffman | Mar. 12, 1940 |
| 2,246,086 | Austin | June 17, 1941 |
| 2,246,092 | Gilman | June 17, 1941 |
| 2,309,729 | Gordon | Feb. 2, 1943 |
| 2,342,378 | Smith | Feb. 22, 1944 |
| 2,618,020 | Busse et al. | Nov. 18, 1952 |